United States Patent
Masson et al.

(10) Patent No.: US 11,867,149 B2
(45) Date of Patent: Jan. 9, 2024

(54) OFFSHORE COLUMN TENSION LEG PLATFORM

(71) Applicant: Oil States Industries, Inc., Arlington, TX (US)

(72) Inventors: Peter Craig Masson, Katy, TX (US); Jonathan Frederick Jury, Aberdeenshire (GB)

(73) Assignee: Oil States Industries, Inc., Arlington, TX (US)

( * ) Notice: Subject to any disclaimer, the term of this patent is extended or adjusted under 35 U.S.C. 154(b) by 0 days.

(21) Appl. No.: 18/301,834

(22) Filed: Apr. 17, 2023

(65) Prior Publication Data

US 2023/0296081 A1    Sep. 21, 2023

Related U.S. Application Data

(63) Continuation of application No. 18/183,442, filed on Mar. 14, 2023.

(60) Provisional application No. 63/320,569, filed on Mar. 16, 2022.

(51) Int. Cl.
  *E02B 17/00* (2006.01)
  *F03D 13/25* (2016.01)

(52) U.S. Cl.
  CPC .............. *F03D 13/25* (2016.05); *E02B 17/00* (2013.01); *E02B 2017/0043* (2013.01); *E02B 2017/0091* (2013.01); *F05B 2240/917* (2013.01); *F05B 2240/95* (2013.01)

(58) Field of Classification Search
  CPC ............ E02B 2017/0043; E02B 17/00; E02B 2017/0091; F03D 13/25; F05B 2240/95
  USPC ............................................... 405/223.1, 224
  See application file for complete search history.

(56) References Cited

U.S. PATENT DOCUMENTS

| | | | |
|---|---|---|---|
| 4,348,178 A | 9/1982 | Kurz | |
| 4,913,238 A * | 4/1990 | Danazcko | B63B 21/502 166/356 |
| 6,648,555 B2 | 11/2003 | Mommaas et al. | |
| 6,869,252 B1 | 3/2005 | Maini et al. | |
| 8,764,346 B1 * | 7/2014 | Srinivasan | B63B 21/502 405/223.1 |
| 8,960,615 B1 | 2/2015 | Johnson et al. | |
| 9,446,822 B2 * | 9/2016 | Roddier | B63B 39/03 |
| 2011/0120126 A1 * | 5/2011 | Srinivasan | F03G 7/05 60/641.7 |
| 2012/0027523 A1 | 2/2012 | Vanderbeke | |
| 2014/0354974 A1 * | 12/2014 | Brower | G01L 1/242 356/32 |
| 2015/0252791 A1 | 9/2015 | Taub | |

* cited by examiner

*Primary Examiner* — Sean D Andrish
(74) *Attorney, Agent, or Firm* — Morgan, Lewis & Bockius LLP

(57) ABSTRACT

An apparatus and methods for installation of an offshore platform for supporting equipment installations is provided. The apparatus includes a vertical compression assembly and a counteracting tensioning tendon system. The vertical compression assembly may comprise multiple compression members, a column truss, or other configurations.

19 Claims, 6 Drawing Sheets

OFFSHORE COLUMN TENSION LEG PLATFORM

REFERENCE TO RELATED APPLICATIONS

This application is a continuation of U.S. application Ser. No. 18/183,442, filed Mar. 14, 2023, which claims priority to U.S. Provisional Application 63/320,569, filed Mar. 16, 2022, the entire disclosure of each is incorporated herein by this reference.

TECHNICAL FIELD

The present disclosure relates generally to offshore structures, and more particularly, to structures for supporting offshore wind turbines, oil and gas operations, desalination operations, substations, or similar equipment.

Within the embodiments described, there are multiple types of arrangements that provide a stable platform for mounting offshore equipment. While many types of equipment can be supported by the structure disclosed or installed using the steps disclosed herein, reference will be made to one such example—an offshore wind turbine installation. A person of ordinary skill would understand that other equipment can be affixed on the structure disclosed herein and should not be read out of the disclosure because one such example is given.

BACKGROUND OF THE INVENTION

For an offshore installation, generally, the arrangement of piles, underwater structures, and/or the platform type varies based on the depth of the installation. In the case of offshore wind developments, shallow depth installations, or those of less than about 50 meters are typically fixed to the seafloor by a rigid structure anchored by piles. Examples of structures that can be used in shallow waters may include, for example, monopiles, jacket structures, jack-up installations, and the like. The noise pollution created during the installation of driven piles for such fixed structures may be a disadvantage in certain environmentally sensitive locations. As water depth increases beyond approximately 50 meters, the cost of fixed structures rapidly increases because of the additional material costs for the structure to sustain increased wave and current loads, and because the installation vessels required to perform the installation are significantly more expensive. Thus, currently floating platforms are used, or planned to be used, in deeper water.

In deeper water, typically greater than 50 meters water depth for wind developments, floating platforms can alternatively be used. These include, for example, barge, spar buoy, tension-leg platforms, semi-submersible platforms, and the like. The transition depth from fixed structures to floating platforms depends on the wind, wave and current at the site, the seafloor conditions, and economic considerations.

Floating platforms are subject to wave and current loading resulting in challenges that require additional costs to achieve the required stability for supporting equipment, such as a wind turbine, or require modifications to the equipment, or result in reduced operability or up-time for the equipment or additional maintenance and repair. Consequently, as water depth increases beyond 50 meters, or so, the cost of the installation increases significantly regardless of the use of traditional fixed structure or floating platform.

The economics of the offshore wind market requires that the cost of the structures or platforms be minimized. Water depths in the range of 50-150 meters represent a large market opportunity because of the shortcomings of both traditional fixed and floating platform installations and because in many locations ideal wind farm sites, i.e., that are easily accessible, located near available infrastructure, and out of public sight, are within this water depth range. Such transition water depth sites are available for installations in many offshore wind fields around the world, including in the North Sea, Baltic Sea, Celtic Sea, Irish Sea, Mediterranean, Eastern U.S. Seaboard, Gulf of Mexico, Yellow Sea, Taiwan Strait, South China Sea and Bass Strait, among others. Because traditional fixed structures are not as economical in water depths beyond 50 meters, and floating platforms are also relatively expensive and do not perform as well in shallower waters, an improved solution is required for the 50-150 meters water depth range. The current invention seeks to improve upon the use of and options available for installing structures, including for example, wind turbines, in these transition sites around the world.

SUMMARY

One or more embodiments of the invention describe a structure for supporting offshore equipment, including for example wind turbines. One of skill in the art will appreciate that other similar installations could use one or more of the embodiments of the current invention, such as oil and gas operations, desalination operations, substations, or similar offshore operations.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The present disclosure relates generally to offshore structures, and more particularly, to structures for supporting offshore wind turbines and other equipment. As described herein, embodiments of the offshore structure described herein improve upon the traditional offshore structure configurations, especially in transition sites between 50-150 meters water depth.

Figure 1:
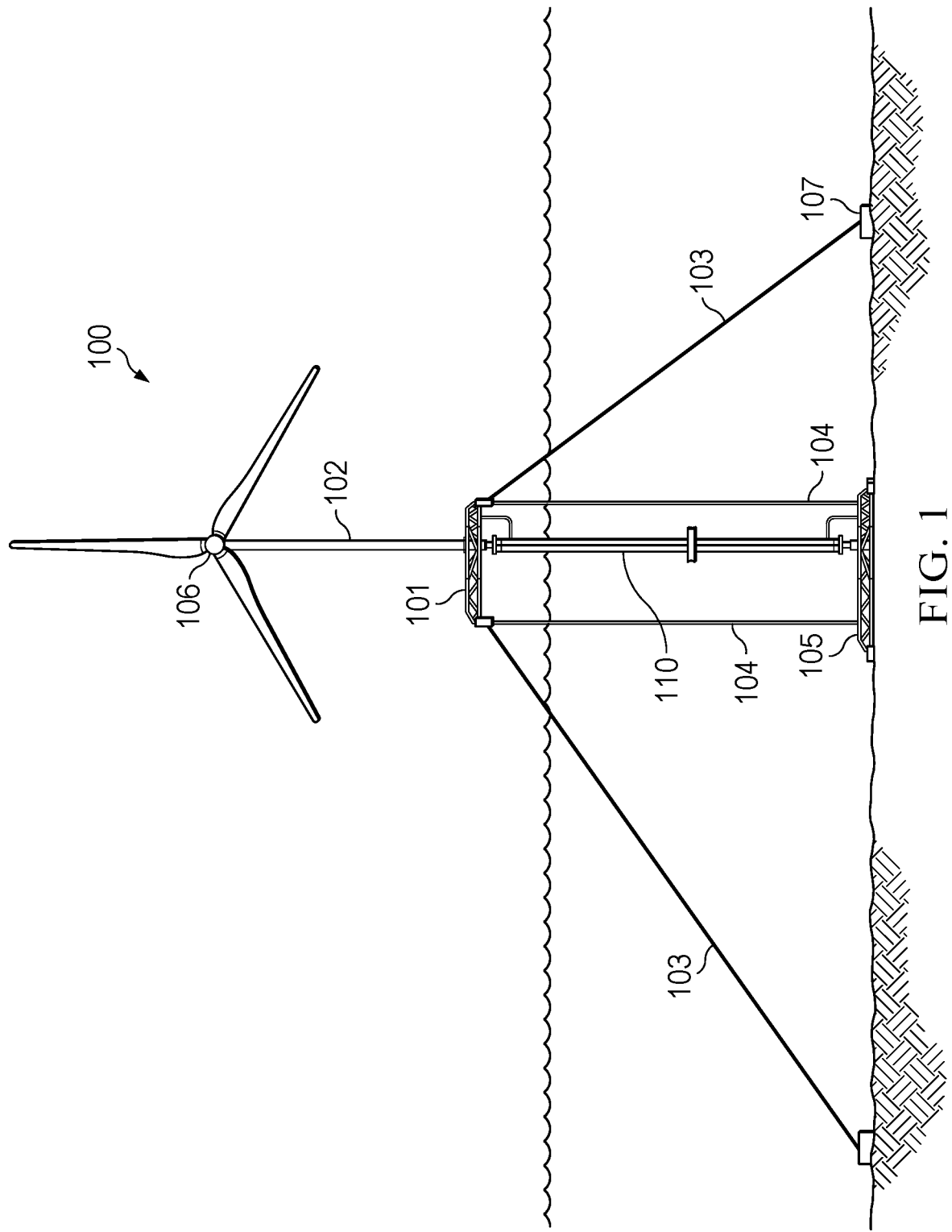
FIG. 1 is a schematic view of an offshore wind turbine installation, in accordance with embodiments of the present disclosure.

FIG. 1 provides a schematic view of an example configuration of an offshore installation 100 to support offshore operations, in this example, a wind turbine 106 and turbine tower 102, in accordance with the embodiments of the present disclosure. In the illustrated embodiment, a top frame structure or top platform 101 supports a wind turbine tower 102 and wind turbine 106. In the illustrated embodiment, the top frame structure 101 is supported by a vertical compression assembly 110 and at least three tension legs (or tendons) 104. The vertical compression assembly 110 and tendons 104 extend to the foundation 105 located on the seafloor. The vertical compression assembly supports the weight of the top frame structure 101, the wind turbine tower 102, and the wind turbine 106, and facilitates tensioning of the tendons 104. The tendons 104 resist rotation of the top frame structure 101 due to wind loading on the turbine and thus maintain a stable platform, which is particularly advantageous in applications supporting a wind turbine or other sensitive equipment. The top frame structure 101 is supported laterally by taut mooring lines 103. In the illustrated embodiment, the top frame structure 101 is supported by at least three taut mooring cables 103. In certain embodiments, three pairs of taut mooring cables 103, may be used to increase yaw stiffness. In this case, each pair of taut mooring cables 103, would be oriented with an angular separation, for example, 60 degrees. The taut mooring cables 103 resist the shear forces acting on the offshore structure by wind, waves, and ocean currents. In the illustrated embodiment, a mooring anchor 107 is used to anchor the taut mooring lines 103 to the seafloor. In the illustrated embodiment, the foundation 105 is located on the seafloor. As would be understood from one of skill in the art, many different foundations may be used, based on the needs of the seafloor as well as prevailing wind, wave, and current loading.

Figure 2:
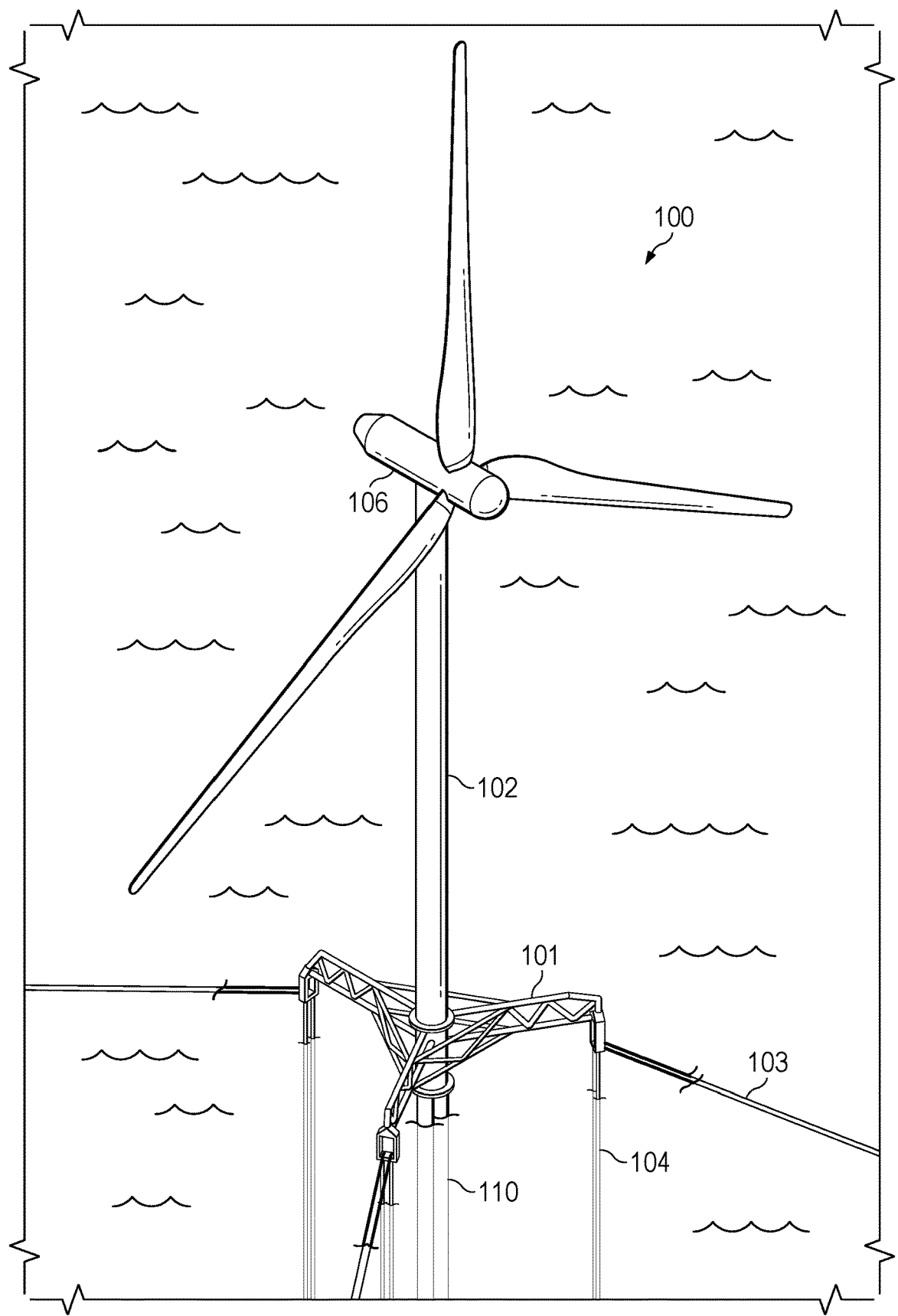
FIG. 2 is a depiction of an offshore wind turbine installation seen from above, in accordance with embodiments of the present disclosure.

FIG. 2 depicts the upper portion of an offshore installation supporting a wind turbine tower 102 and wind turbine 106, in accordance with embodiments of the present disclosure. In the illustrated embodiment, the offshore structure 100 is not a floating hull because the vertical support is provided by the vertical compression assembly 110 from below the water. The vertical compression assembly 110 provides compressive force against the top frame structure 101 in response to the weight of the wind turbine 106, turbine tower 102, and top frame structure 101, and tension forces applied to tendons 104 and taut mooring cables 103, such that the structure is held rigid in its installation location to counteract the impacts of wind, waves, and currents against the offshore structure reducing accelerations and thus mechanical loads on the turbine tower and wind turbine in wind turbine applications.

The illustrated embodiment exposes minimal structure to wave and ocean current loads, in comparison to traditional floating platforms. Advantageously, this reduces the mooring and mooring anchor requirements, helping to minimize environmental disturbance during installation. Additionally, the design provides a smaller footprint than a traditional floating platform because of the reduced mooring requirements, thus providing more space between the offshore installations for vessel movement.

Detailed Description of Components

The vertical compression assembly 110 is connected to a top frame structure 101 and a foundation 105. The vertical compression assembly 110 will support the weight of the turbine 106, tower 102, and top frame structure 101 while counteracting the tension in the tendons 104.

In certain embodiments, the top and bottom ends of the vertical compression assembly 110 are connected to the top frame structure 101 and foundation 105, respectively, with flexible connections allowing rotation in any direction. In certain embodiments, the connections between the upper and bottom ends of the vertical compression assembly 110 and the top frame structure 101 and foundation 105 are fixed. It would be understood by one of skill that a fixed connection would allow limited rotational freedom while maintaining axial stiffness. As would be understood by one of skill in the art, any combination of fixed or flexible connections may be used depending on the design requirements. In some embodiments, it may be beneficial to use a pinned connection during operation but lock the connection during installation.

Figure 3:
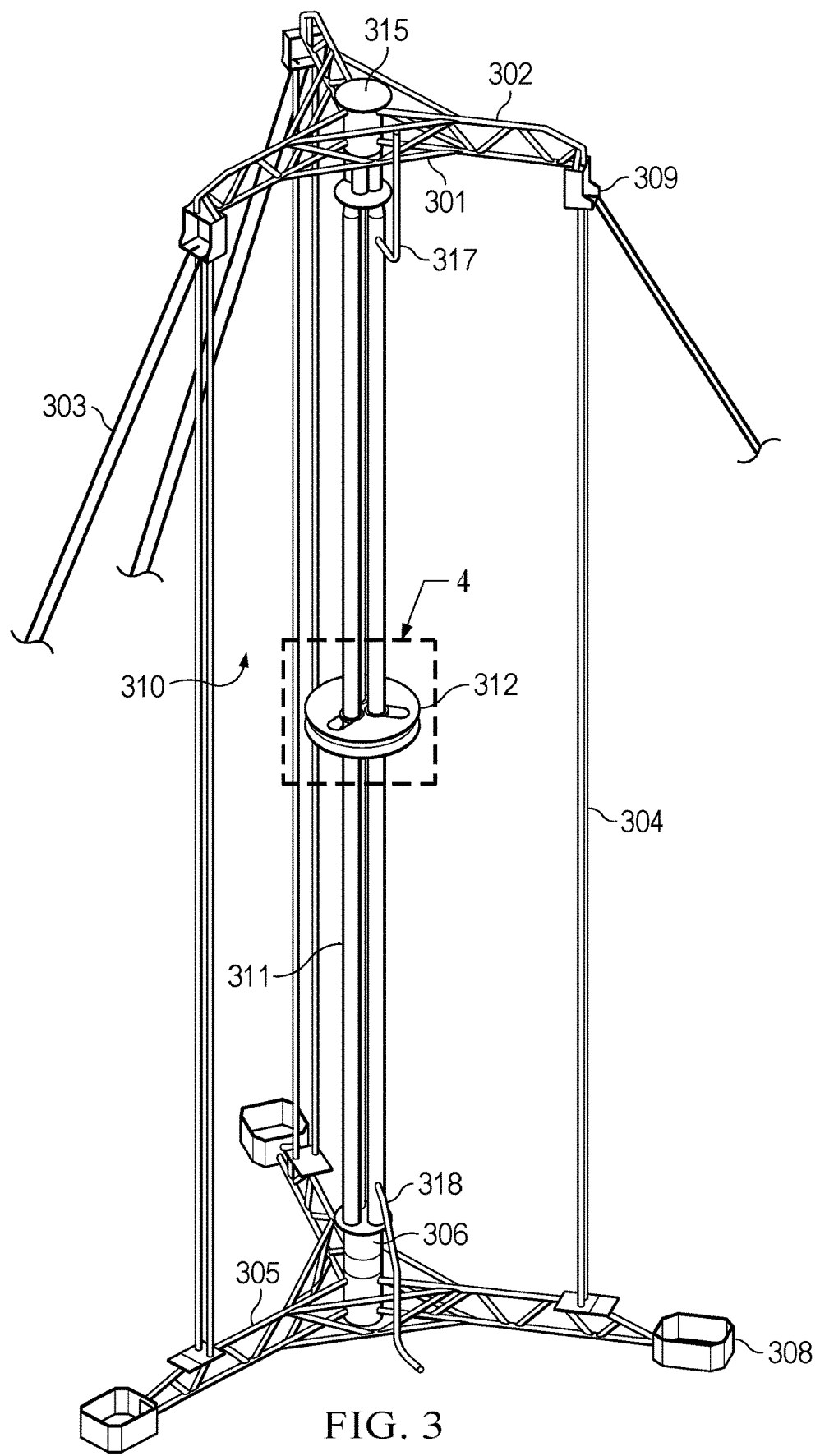
FIG. 3 is an isometric view of the offshore wind turbine platform, in accordance with embodiments of the present disclosure.

FIG. 3 is an isometric view of an offshore platform 100, which can be used in accordance with the embodiments of the present disclosure. In the illustrated embodiment, the vertical compression assembly 310 is connected to a top frame structure 301 and a foundation 305. The top frame structure 301 has a center point with a plurality of protruding sections 302 that extend out from the center point. In certain embodiments, each protruding section 302 of the top frame structure 301 has a truss arrangement. The top frame structure 301 supports the installation of the equipment, such as a wind turbine 106, on the structure, for example at connection point 315. The protruding sections 302 extend out from the center point of the top frame structure 301 to a tendon attachment porch 309 which holds a tendon 304 in tension. Taut mooring cables 303 used for laterally supporting the top frame structure 301 may be connected to the protruding sections 302 at the tendon attachment porch 309. The tendon 304 connect the top frame structure 301 to the foundation 305. The foundation 305 provides stability to the offshore structure. It would be understood that the foundation 305 could be any number of foundations. The foundation 305 includes a plurality of protruding sections much like the protruding section 302 of the top frame structure 301. The protruding sections of the foundation 305 connect to the tendons 304 much like the top frame tendon attachment porch 309 of the top frame structure 301 connect to the tendons 304. In the configuration shown, each of the protruding sections from the top frame structure and foundation are offset by 120 degrees such that they are equal distances from each other. It would be understood that the frame structures could have any number of protruding sections 302 connected to tendons 304 depending on engineering requirements.

The tendons 304 are tensioned to a degree such that they will always remain in tension while in operation. The number of tendons and degree of tension of the tendons 304 is determined based on the water depth, turbine size and the expected waves, currents, and wind patterns experienced at the site. Tension is conveyed to each tendon by way of its connection to tendon attachment porch 309.

In certain embodiments, the foundation 305 may be stabilized on the seafloor by use of weight baskets 308 on each of the protruding sections 302. In certain embodiments, the foundation 305 is anchored to the seafloor by piles located through pile guides as an alternative to weighted baskets 308. In certain embodiments, mud mats are included to limit penetration into the seafloor.

The vertical compression assembly 310 will support the weight of the turbine 106, turbine tower 102, and top frame structure 301 and counteract the tension in the tendons 304 by acting in compression. The vertical compression assembly 310 may be designed to resist global buckling by having a varying compound section along its length. In the illustrated embodiment, the vertical compression assembly 310 includes multiple compression members 311 that extend from top frame structure 301 to foundation 305. In the illustrated embodiment, the vertical compression assembly 310 includes at least three compression members 311. The plurality of compression members 311 are supported by a compression member guide 312 which allows each compression member 311 to deflect outward from the center of the assembly, thereby increasing the compound section second moment of area, but limiting the deflection and ultimately restraining the compression members 311 laterally against each other to prevent global buckling of the individual compression members 311 and therefore of the composite vertical compression assembly 310. In certain embodiments, the compression member guide 312 is positioned at a point equidistant between the top frame structure 301 and the foundation 305. In the illustrated embodiment, each compression member 311 extends through the compression member guide 312. In certain embodiments, the top and bottom ends of the vertical compression assembly 310 are connected to the top frame structure 301 and foundation 305, respectively, with flexible connections 306 allowing rotation in any direction. In certain embodiments, the connections between the ends of the vertical compression assembly 310 and the top frame structure 301 and foundation 305 are rigid. As would be understood by one of skill in the art, any combination of fixed or flexible connections 306 may be used depending on the design requirements.

In certain embodiments, the turbine tower 102 is stayed to the outside ends of the protrusion sections 302 supporting both the turbine tower 102 against wind loads and the protrusion sections 302 against the loads from the tendons.

In certain embodiments, the compression members 311 are connected to end plates on the vertical compression assembly 310 by pins orthogonal to the plane of bending dictated by the slots in the compression member guide 312, but may be connected in any number of ways that would be apparent to one of skill in the art.

In certain embodiments, the vertical compression assembly 310 may be a column truss. In certain embodiments, the compression members 311 are made up of pre-fabricated joints with mechanical connections attached at each end of the joints such that they are easily transported to a location convenient for final assembly of the compression members 311 before installation.

An umbilical for power may be installed within one of the compression members 311, entering the compression member 311 from an insertion point 317 near the top frame structure 301 and exiting at a bottom insertion point 318 near the foundation 305. This is advantageous because the umbilical is shielded from wave and current loading and thus dynamic loads and associated fatigue damage is reduced. Alternatively, the power umbilical may be clamped to the outside of the vertical compression assembly 110 or a tendon 104.

In certain embodiments, the tendons 304 may be adjustable in accordance with the embodiments of the present disclosure. The tendons 304 may include adjustable sections or adjustable connections to the top frame structure 301.

Figure 4:
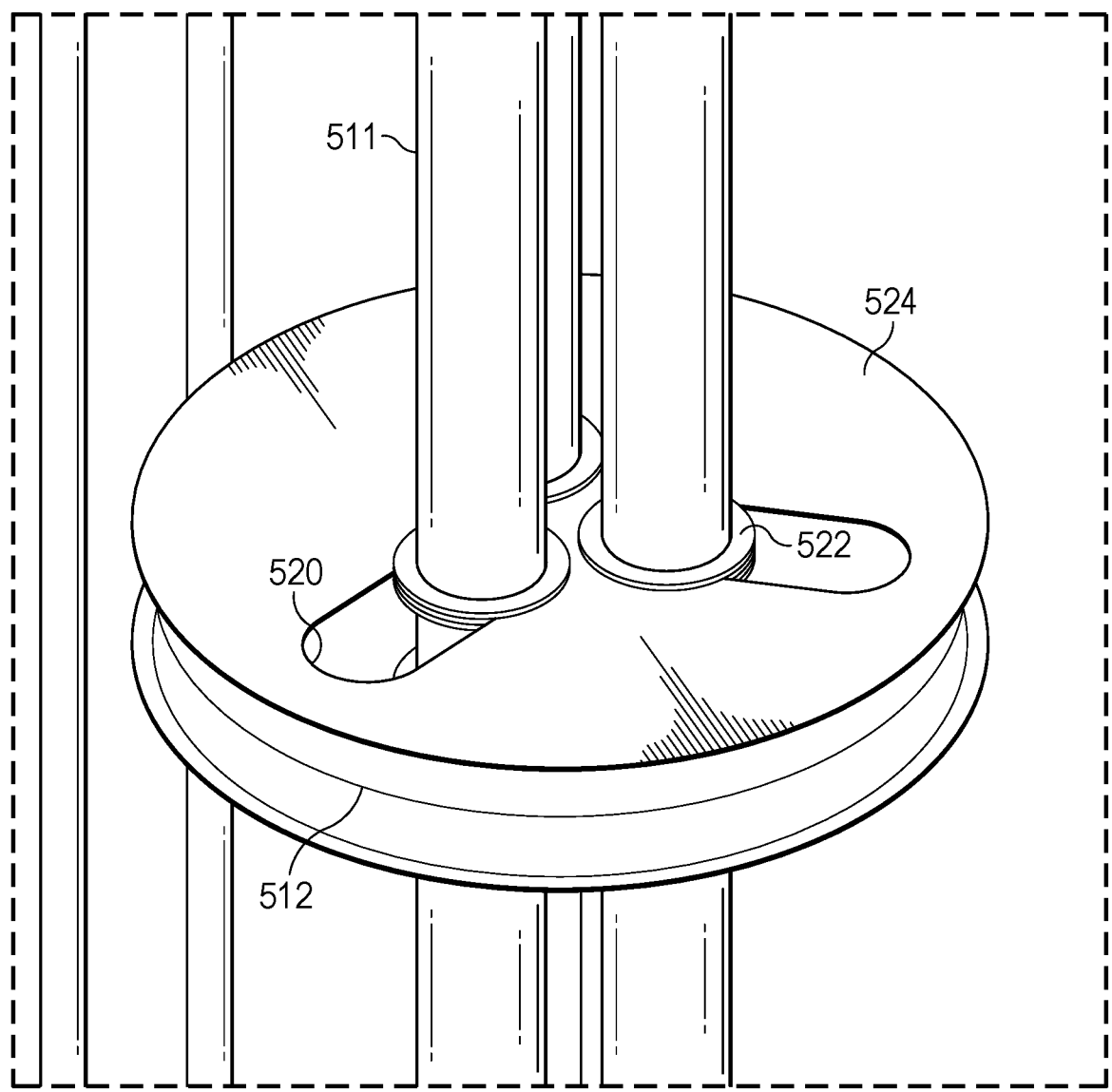
FIG. 4 depicts an isometric view of a compression guide member, in accordance with the embodiments of the present disclosure.

FIG. 4 depicts an isometric view of the vertical compression assembly at the compression member guide or buckle stop 512, in accordance with the embodiments of the present disclosure. In the illustrated embodiment, there are three compression members 511. Each compression member 511 passes through compression member guide 512. The compression member guide 512 includes a guide slot 520 for each compression member 511. In the illustrated embodiment, a guide retainer 522 is installed on each compression member 511. Once the compression members 511 are positioned in the guide slots 520, guide retainers 522 may be installed on the compression members 511 on both the top and bottom sides of the compression member guide 512.

In the illustrated embodiment, the guide slot 520 allows the compression members 511 to move towards the external portion of a guide body 524 and eventually exert additional forces on the terminal end of guide slot 520 as compression increases on the compression members 511.

A person of ordinary skill in the art would understand that a structural component between compression members 511, to increase the composite bending strength of the column assembly, such as compression member guide 512, could be positioned at any point between the top frame structure 101 and the foundation 105. A person of ordinary skill in the art would understand that it may be advantageous to position such structural components equidistant between the top frame structure 101 and the foundation 105 to optimize buckling capacity. A person of ordinary skill in the art would also understand that, in some instances, it may be advantageous to include multiple such structural components positioned between the top frame structure 101 and the foundation 105. In some embodiments, the structural component is fabricated from standard structural grade steel such as API 2H Grade 50.

The compression members 511 are preloaded by the tensioning of the tendons 304. As noted, this preloaded compression is thereby increased to the operational state by increasing the tension on the tendons 304. The counteracting tension and compression provides good dynamic performance similar to a conventional tension leg platform installation but with a better range of water depths, including for offshore wind installations.

In the illustrated embodiment, taut mooring cables are used. Taut mooring cables are well known to one of ordinary skill in the art and the present disclosure is not limited to any particular type or configuration of such mooring lines. In certain embodiments, a segment of chain is used at each end of the moorings.

Figure 5:
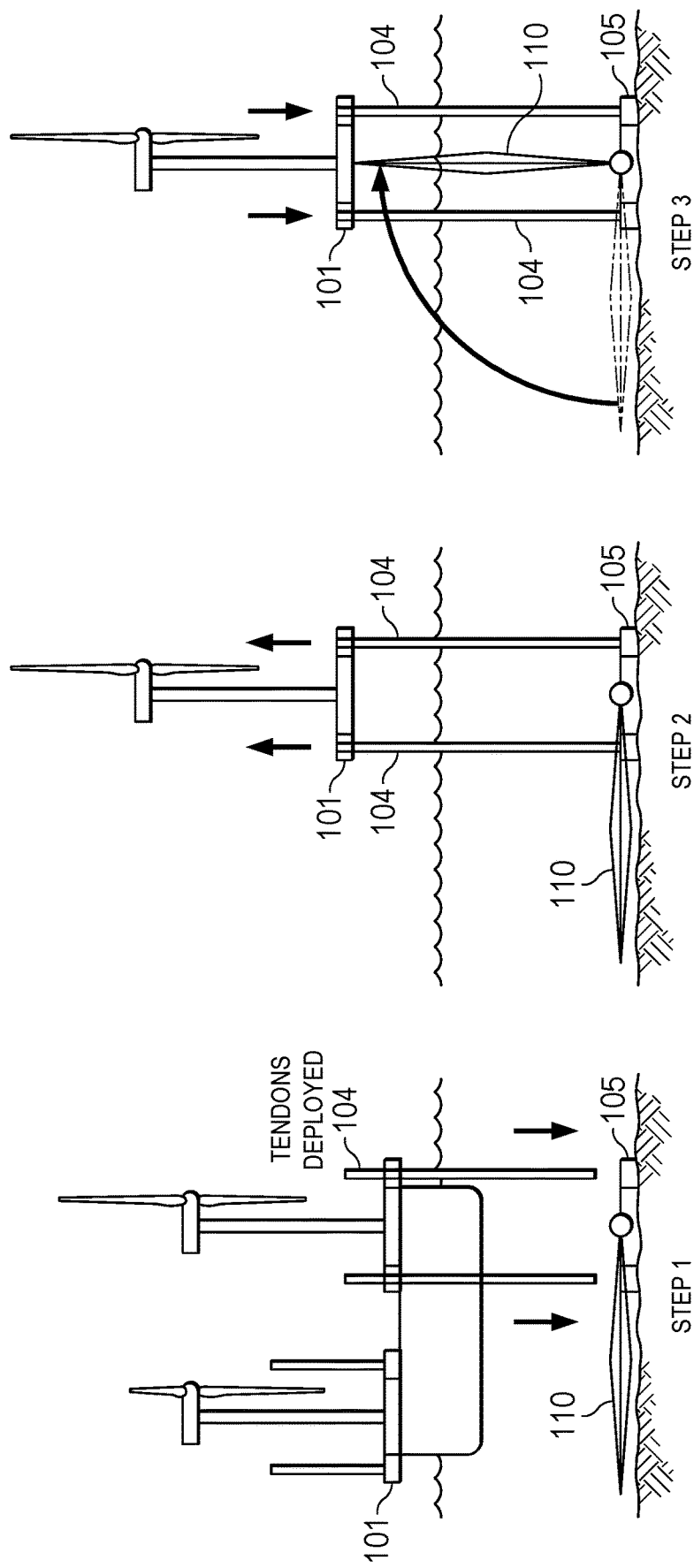
FIG. 5 depicts an installation procedure for the wind turbine platform, in accordance with embodiments of the present disclosure.

FIG. 5 depicts a method for installing an offshore platform, in accordance with embodiments of the present disclosure. At step 1, the top frame structure 101 is skidded onto an installation vessel or barge complete with the equipment, in the illustrated embodiment a wind turbine, and is floated out to the installation site. The installation site already includes the foundation 105 and vertical compression assembly 110. Once the installation vessel or barge is located above the foundation 105, the tendons 104 are deployed from the top frame structure 101 to the foundation 105 located on the seafloor at the transition site. At step 2, the tendons 104 are used to jack the top frame structure 101 clear of the installation vessel or barge. In the illustrated embodiment, the tendons 104 are designed to support the top frame structure 101 temporarily during installation. The installation vessel or barge then departs the area leaving the top frame structure 101 above the transition site tethered to the foundation via the tendons 104. At step 3, the vertical compression assembly 110 is lifted so that the vertical compression assembly 110 connects with the top frame structure 101. At this point, additional tendons 104 can be deployed from the top frame structure 101 to the foundation 105. Tension is then applied to the tendons 104.

Figure 6:
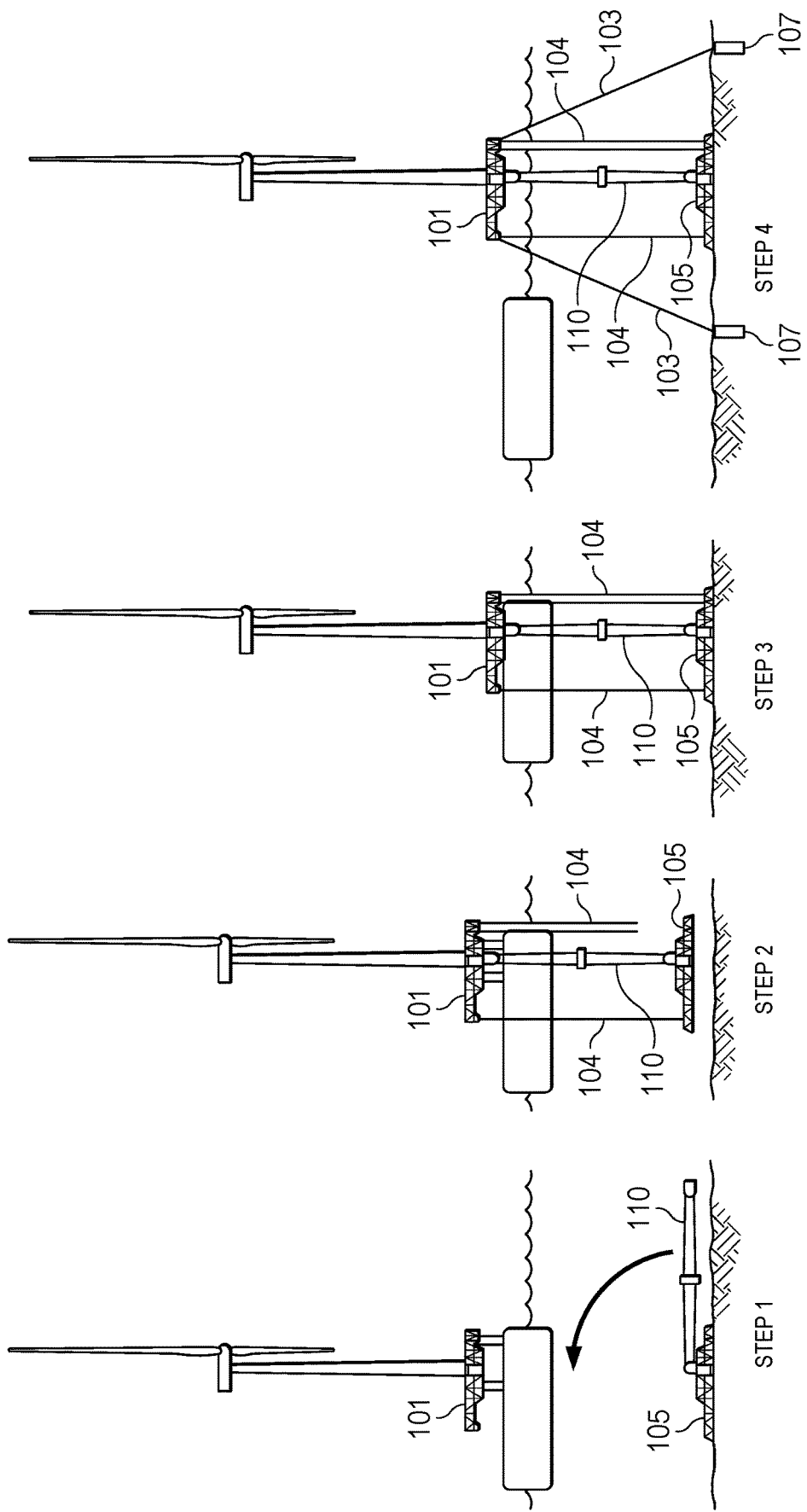
FIG. 6 depicts an alternative installation procedure for the wind turbine platform, in accordance with embodiments of the present disclosure.

FIG. 6 depicts an alternative method for installing an offshore platform, in accordance with embodiments of the present disclosure. As shown in step 1, the installation site already includes the foundation 105 and vertical compression assembly 110. The top frame structure 101 is floated out to the installation site on an installation vessel or barge. In the illustrated embodiment, the top frame structure 101 supports a wind turbine. At step 2, the foundation 105 and vertical compression assembly 110 are disposed below the ocean surface with the vertical compression assembly 110 connected to both the top frame structure 101 and the foundation 105, and such that the foundation 105 is raised clear of the seafloor. The tendons 104 are deployed from the top frame structure 101 to the foundation 105 located just above the seafloor at the transition site. At step 3, tension is applied to the tendons 104 so that the vertical compression assembly 110 is compressed. The platform is then lowered until the foundation 105 is landed on the seafloor. The taut mooring anchors 107 are pre-installed at the installation site. At step 4, the taut moorings 103 are installed, the installation vessel is removed, and the moorings 103 are tightened. Alternatively, the taut moorings 103 may be pre-attached to the top frame structure 101 before the platform is lowered to the seafloor. In this case, the taut moorings 103 would initially be installed with some slack, which would be removed once the platform is located on the seafloor. Additional tension may be applied to the tendons 104 if required to offset reduction in tension due to the weight of the turbine.

In certain embodiments a diver-less subsea connection is used to connect the vertical compression assembly 110 to the foundation 105.

In certain embodiments the foundation 105 is anchored to the seafloor using piles or weights.

In certain embodiments, the materials for installations can be created from components manufactured close by to the installation, such as installations in the North Sea where manufacturing happens in the UK. In certain embodiments, for cases where there is limited local manufacturing capability, the installation can be created from modular components pre-fabricated at low-cost locations and transported to ports close by to the installation for assembly. With pre-manufactured components, the structure may be partially assembled on shore or near shore to save with installation time and effort.

Further, these installations can be installed with standard vessels in transition sites, and the tower can be installed onshore eliminating the requirements for expensive heavy lift crane barges and vessels. Further, the portion of the installation on the seafloor can be pre-installed prior to the installation of the turbine tower section itself, which minimizes the time required of sea vessels during installation of the turbine tower and increases the ability to perform multiple turbine tower installations at once.

Thus, the current design is cost competitive with fixed tower and floating solutions at a time when the offshore wind industry is looking to provide more installations in these transition site depths. This design also provides a reduced environmental impact relative to the other known solutions.

Access to the tower for maintenance personnel is provided by means of a ladder or gangway connection to the top frame structure and grated walkway with handrails.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A method for installing an offshore installation on a seafloor, comprising:
    mounting offshore equipment having a first weight on a top frame structure having a second weight and comprising a top surface and a bottom surface;
    transporting the top frame structure and offshore equipment to an installation site;
    installing a foundation and vertical column assembly on the seafloor at the installation site;
    positioning the top frame structure above the foundation;
    deploying tendons from the top frame structure to the foundation;
    lifting an end of the vertical column assembly to contact the bottom surface of the top frame structure, such that the vertical column assembly supports the first weight and the second weight of the top frame structure and offshore equipment; and
    applying tension to the tendons.

2. The method of claim 1, further comprising lifting the top frame structure clear of an installation vessel before the vertical column assembly is lifted to contact the top frame structure.

3. The method of claim 1, further comprising:
attaching a plurality of lateral supports to the top frame structure; and
extending the plurality of lateral supports from the top frame structure to the seafloor.

4. The method of claim 1, wherein the vertical column assembly comprises a column truss.

5. The method of claim 1, wherein the offshore equipment comprises a wind turbine.

6. A method for installing an offshore installation on a seafloor, comprising:
mounting offshore equipment having a first weight on a top frame structure having a second weight and comprising a top surface and a bottom surface;
transporting the top frame structure and offshore equipment to an installation site;
installing a foundation and vertical column assembly on the seafloor at the installation site;
positioning the top frame structure above the foundation;
lifting an end of the vertical column assembly to contact the bottom surface of the top frame structure, such that the vertical column assembly supports the first weight and the second weight of the top frame structure and offshore equipment;
lifting the foundation off the seafloor with the vertical column assembly;
deploying tendons from the top frame structure to the foundation;
lowering the foundation to the seafloor via the tendons; and
applying tension to the tendons.

7. The method of claim 6, further comprising:
attaching a plurality of lateral supports to the top frame structure; and
extending the plurality of lateral supports from the top frame structure to the seafloor.

8. The method of claim 7, wherein the step of attaching the plurality of lateral supports to the top frame structure is performed before the foundation is installed on the sea floor.

9. The method of claim 6, wherein the vertical column assembly comprises a column truss.

10. The method of claim 6, wherein the offshore equipment comprises a wind turbine.

11. The method of claim 1, wherein the vertical column assembly comprises a plurality of compression members.

12. The method of claim 11, wherein the vertical column assembly further comprises a central longitudinal axis and the plurality of compression members are configured to deflect radially outward from the central longitudinal axis.

13. The method of claim 12, wherein the vertical column assembly further comprises a compression member guide configured to limit an extent of the radially outward deflection of the plurality of compression members.

14. The method of claim 3, wherein the plurality of lateral supports comprise mooring lines and the method further comprises the step of tightening the mooring lines.

15. The method of claim 6, wherein the vertical column assembly comprises a plurality of compression members.

16. The method of claim 15, wherein the vertical column assembly further comprises a central longitudinal axis and the plurality of compression members are configured to deflect radially outward from the central longitudinal axis.

17. The method of claim 16, wherein the vertical column assembly further comprises a compression member guide configured to limit an extent of the radially outward deflection of the plurality of compression members.

18. The method of claim 7, wherein the plurality of lateral supports comprise mooring lines.

19. The method of claim 18, further comprising the step of tightening the mooring lines after the foundation is installed on the seafloor.

* * * * *